Patented Nov. 16, 1926.

1,607,472

UNITED STATES PATENT OFFICE.

FRANK C. MATHERS, OF BLOOMINGTON, INDIANA, AND SAMUEL CRAWFORD SHIRLEY, OF ELIZABETH, NEW JERSEY, ASSIGNORS TO NATIONAL LIME ASSOCIATION, OF WASHINGTON, DISTRICT OF COLUMBIA, A CORPORATION OF THE DISTRICT OF COLUMBIA

DRY LIME MIXTURE.

No Drawing. Application filed November 5, 1925. Serial No. 67,183.

Our invention relates to the provision of a dry lime mixture containing a quick setting agent which will not deteriorate during storage and thereby lose its property of setting quickly when made into a plastic mass.

Hydrated lime by itself does not, when made into a plastic mass by the addition of water possess any quick setting properties. The addition thereto of certain quick setting agents such as carbonates, sulfates or aluminates result in a product that will set in a few hours. For example, a quick setting mixture may be made by partially carbonating hydrated lime or by adding magnesium or sodium carbonate in quantities approximately 3 to 5 per cent of the mixture. Such dry mixtures when stored have the very great disadvantage of suffering a gradual deterioration whereby the setting time of the mixture gradually increases until finally the mixture has approximately the same setting time as hydrated lime without a quick setting agent.

We have discovered how to prepare a ready mixed quick setting material such as a plaster which will set in the required time regardless of the period it is kept in storage before use. This may be accomplished by coating the particles of the quick setting agent before it is mixed with the hydrated lime with a water soluble coating. A ready mixed plaster containing a quick setting agent so treated will resist deterioration so as to prevent during storage the loss of its quick setting property and yet when the dry mixture is made into a mortar, the water soluble coating will dissolve and its presence will not affect the quick setting property of the mortar or reduce the early or ultimate strength thereof. It is of the greatest importance that these properties of the mortar be not affected or destroyed by the protective coating applied to the quick settting ingredient. A water soluble carbohydrate coating material such as starch, meal, low grade corn and dextrin has been found to give satisfactory results but it is to be distinctly understood that our invention is not limited to the employment of this particular material.

Our invention may be illustrated by the following specific example. It is, however, to be clearly understood that such illustration is not given by way of limitation but rather, as an example of one of water soluble coatings or films which may be used. Sodium bicarbonate or magnesium carbonate or a mixture thereof is mixed to a damp paste with a boiled starch solution which may be made by boiling 1 gram of starch in 100 c. c. of water. Sufficient carbonate is added to form a thick pasty mass. The resulting paste is dried whereupon the mass becomes hard and firm and resistant to disintegration as long as it is kept dry. Air drying at a temperature of 100° C. has been found satisfactory. The size and shape of the lumps of coated carbonate may vary. In some of our experiments the pellets were made more or less spherical in shape and so used. In other experiments the quick setting agent-starch mass was dried in irregular masses and ground to about 40 mesh before mixing with the hydrated lime. The latter procedure is preferred as it will give the completest mixing of the ingredients during the incorporation of sand and water. About 300 c. c. of a one per cent starch solution is required to make a pasty mass with 100 grams of precipitated magnesium carbonate. Therefore, roughly, the amount of starch required for a ton of magnesium carbonate is about 60 pounds.

A prepared dry plaster mix containing hydrated lime and starch hardened lumps or particles of magnesium carbonate and of sodium bicarbonate, shows no appreciable measurable deterioration in 85 days.

When using magnesium carbonate as the quick setting agent the starch solution may be incorporated in the magnesium carbonate, while the latter is still wet at the time of manufacture. Using this procedure the cost of making the starch coated magnesium carbonate is naturally reduced.

The starch instead of being dissolved in water may be first made into a soluble starch by an acid treatment or by hydrolyzing the starch with caustic soda as is done in starch adhesive work and the resulting material dissolved in water. However, the simplest, the most economical and the preferred method of preparing starch paste is to simply boil the starch in water.

Instead of using a protecting soluble coating such as starch; gum arabic, casein, and animal glue solutions may be used but the best results have been obtained by using the starch solution.

It is to be understood that our broad invention resides in the production of a quick drying cementitious mixture resistant to deterioration during prolonged storage and retaining its ability to set quickly thereafter, comprising a lime base and a quick setting agent, the particles of which are covered with a protecting water soluble coating, said coating being sufficiently firm so as to avoid intimate mixture with the lime base during storage. We desire to protect broadly a dry lime mixture containing a quick setting agent which will not deteriorate during storage and thereby lose its property of setting quickly when made into a plastic mass.

We claim:—

1. As a new article of manufacture, a dry quick setting cementitious mixture resistant to deterioration during prolonged storage and retaining its ability to set quickly thereafter, comprising a lime base and a quick setting agent, the particles of which are covered with a protecting water soluble coating, said coating being sufficiently firm so as to avoid intimate mixture with the lime base during storage.

2. As a new article of manufacture, a dry quick setting cementitious mixture resistant to deterioration during prolonged storage and retaining its ability to set quickly thereafter, comprising hydrated lime and a quick setting agent, the particles of which are covered with a protecting water soluble coating, said coating being sufficiently firm so as to avoid intimate mixture with the line base during storage.

3. As a new article of manufacture, a dry quick setting cementitious mixture resistant to deterioration during storage and retaining its ability to set quickly thereafter comprising hydrated lime and a quick setting agent, the particles of which are covered with a water soluble carbohydrate coating, said coating being sufficiently firm so as to avoid intimate mixture with the hydrated lime during storage.

4. As a new article of manufacture, a dry quick setting cementitious mixture resistant to deterioration during prolonged storage and retaining its ability to set quickly thereafter, comprising hydrated lime and a quick setting agent, the particles of which are covered with a protecting starch coating, said coating being sufficiently firm so as to avoid intimate mixture with the hydrated lime during storage.

5. A mixture of dry hydrated lime and a quick setting agent coated with a water soluble protecting film.

6. A mixture of dry hydrated lime and a quick setting agent coated with a carbohydrate protecting film.

7. A mixture of dry hydrated lime and a quick setting agent coated with a starch protecting film.

8. A mixture of dry hydrated lime and a coated quick setting agent made by mixing a boiled starch solution with the quick setting agent until the mixture of the two forms a thick pasty mass and thereafter drying until the mass becomes hard and firm.

9. The process of preparing a coated quick setting agent resistant to disintegration upon prolonged storage in the presence of a lime base, comprising mixing a quick setting agent with a protecting soluble coating material until the mixture forms a damp, pasty mass, and then drying said pasty mass until the latter becomes hard and firm.

10. The process of preparing a coated quick setting agent resistant to disintegration upon prolonged storage in the presence of a lime base, comprising mixing a quick setting agent with a starch solution until the mixture forms a lumpy, pasty mass and drying said mixture until the latter becomes hard and firm.

11. The process of preparing a coated quick setting agent resistant to disintegration upon prolonged storage in the presence of a lime base, comprising mixing a quick setting agent with a starch solution of low concentration until the mixture forms a damp, pasty mass, drying the mixture until the mass becomes hard and firm and finely grinding.

In testimony whereof they hereunto affix their signatures.

FRANK C. MATHERS.
S. CRAWFORD SHIRLEY.